Patented Jan. 26, 1937

2,069,053

UNITED STATES PATENT OFFICE 2,069,053

VULCANIZED RUBBER AND METHOD OF VULCANIZING THE SAME

John E. Whittenberg, Akron, Ohio, assignor to The Firestone Tire & Rubber Company, Akron, Ohio, a corporation of Ohio No Drawing. Application May 8, 1934, Serial No. 724,621

6 Claims. (Cl. 18—53)

This invention relates to vulcanized rubber compositions and to methods of vulcanizing the same.

The chief objects of the invention are to provide for the vulcanization of rubber by the use of a new and desirable activator or accelerator; to reduce the cost of vulcanizing rubber; and to effect vulcanization by the use of an activator or accelerator group that comprises both soluble and insoluble forms so as to be suitable for compounding with calendered rubber stocks and with natural or artificial aqueous dispersions of rubber, such as rubber latex.

The invention relates more specifically to the use of a metal bornyl-xanthogenate as an accelerator, or as an activator of 2-mercapto-benzothiazole used as an accelerator, and other commercial accelerators and activators. If a soluble bornyl-xanthate is desired, the metal preferably will be sodium. If an insoluble salt is desired, the metal preferably will be lead. Also the salt may be formed from analogous metals such as potassium, zinc, and cadmium. Analogous compounds wherein the borneol radical is substituted are made by starting with terpene alcohols, such as fenchyl alcohol or alpha-terpineol. In place of the metal xanthogenate it is possible to substitute dibornyl dithiodicarbothionate.

Sodium-bornyl-xanthogenate may be made by any standard literature method, the following illustrative example being made according to Bamberger & Lodter: Ber. 23, 214 (1890)

25 g. borneol ($C_{10}H_{17}OH$)
6.5 g. metallic sodium, cut fine
40 c. c. benzene, C. P.

The ingredients are refluxed for 16 hours, after which the mix is cooled and the liquid is poured off from residual sodium. To the remainder is added 15 g. (12 c. c.) of $CS_2$ (C. P.) with cooling. This produces a yellow precipitate. Dried on a suction filter, this mix produced a wet yield of 39.8 grams of sodium bornyl-xanthogenate of the probable formula

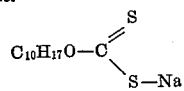

The salt has a melting point above 200° C. and is soluble in water, thus making it suitable for use as an accelerator in rubber latex.

As a substitute for the foregoing compound, certain other metals may be used in place of the sodium, for example, lead, which produces an insoluble salt suitable for incorporating in batches of masticated rubber. Lead-bornyl-xanthate may be produced from sodium-bornyl-xanthate in the following manner. Five grams sodium-bornyl-xanthogenate are dissolved in 50 c. c. water and 4.25 g. lead acetate, $$Pb(C_2H_3O_2)_2 + 3H_2O \text{ in } 50 \text{ c. c.}$$

water added. This produces a yellow-brown precipitate which, when washed and dried, yields 4.8 g. (73% based on sodium-bornyl-xanthogenate) gray powder of the probable formula

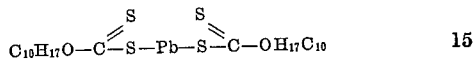

The powder is insoluble in water and has a melting point above 200° C.

Zinc also may be substituted for the sodium in sodium-bornyl-xanthogenate according to the following method. Five grams sodium-bornyl-xanthogenate is dissolved in 50 c. c. water and a solution of 4 g. zinc sulfate $ZnSO_4$ in 50 c. c. water added. This gives a heavy white precipitate which is washed with water, and when dried yields 4.7 g. (90%) zinc-bornyl-xanthogenate of the probable formula

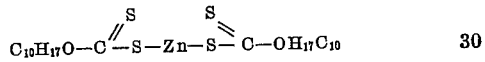

This salt is an insoluble white powder having a melting point above 200° C.

The metal bornyl-xanthogenate also may comprise cadmium, which metal is introduced into the compound by mixing a water-soluble salt of the metal with sodium-bornyl-xanthogenate in a manner similar to the preparation of the lead and zinc compounds described. Potassium-bornyl-xanthate is a soluble salt that may be used in place of sodium-bornyl-xanthate, and the cadmium compound is an insoluble salt.

In a modification of the compound, other compositions in the terpene alcohol group may be substituted for borneol, such as fenchyl alcohol or alpha-terpineol.

In another modification of the compound, dibornyl dithiodicarbothionate is substituted for the metal xanthogenate. Production of this modified compound is effected by treating a solution 11 parts sodium-bornyl-xanthogenate and 1000 parts water with an iodine solution comprising 8 parts iodine ($I_2$), 12 parts potassium iodide (KI), and 500 parts water. This procedure splits off the sodium, permitting 2 molecules of xanthogenate to combine to form the dibornyl dithiodicarbothionate of the probable formula

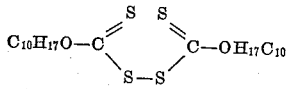

The improved composition may be produced relatively cheaply by the methods described, as compared to the cost of other well known accelerators and activators used in the vulcanizing of rubber.

Other modification may be resorted to without departing from the spirit of the invention or the scope of the appended claims.

What is claimed is:

1. The method of vulcanizing rubber which comprises heating it in the presence of a vulcanizing agent and lead bornyl-xanthogenate.

2. The method of vulcanizing rubber which comprises heating it in the presence of sulphur, an organic accelerator, and an activator consisting of lead bornyl-xanthogenate.

3. The method of vulcanizing rubber which comprises heating it in the presence of sulphur and lead bornyl-xanthogenate.

4. A vulcanized rubber that is derived from rubber composition incorporated with a vulcanizing agent and lead bornyl-xanthogenate.

5. A vulcanized rubber that is derived from rubber composition incorporated with sulphur, an organic accelerator, and an activator consisting of lead bornyl-xanthogenate.

6. A vulcanized rubber that is derived from rubber composition incorporated with sulphur and lead bornyl-xanthogenate.

JOHN E. WHITTENBERG.